T. C. HISTED.
ORE MILL.
APPLICATION FILED MAR. 19, 1909.

949,982.

Patented Feb. 22, 1910.
6 SHEETS—SHEET 1.

WITNESSES
F. C. Barry
Amos W. Hart

INVENTOR
THADDEUS C. HISTED
BY Munn & Co.
ATTORNEYS

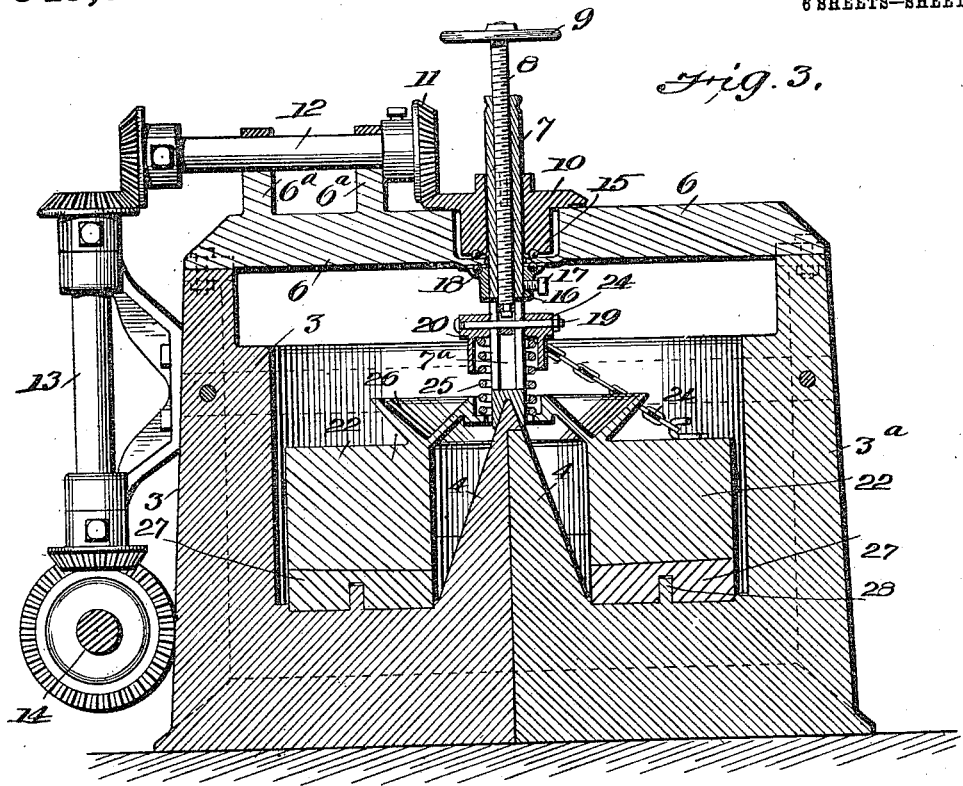

T. C. HISTED.
ORE MILL.
APPLICATION FILED MAR. 19, 1909.

949,982.

Patented Feb. 22, 1910.
6 SHEETS—SHEET 3.

WITNESSES
F. C. Barry
Arno W. Hart

INVENTOR
Thaddeus C. Histed
BY Munn & Co.
ATTORNEYS.

T. C. HISTED.
ORE MILL.
APPLICATION FILED MAR. 19, 1909.

949,982.

Patented Feb. 22, 1910.
6 SHEETS—SHEET 4.

WITNESSES
F. C. Barry
Amos W. Hart

INVENTOR
THADDEUS C. HISTED
BY Munn & Co.
ATTORNEYS

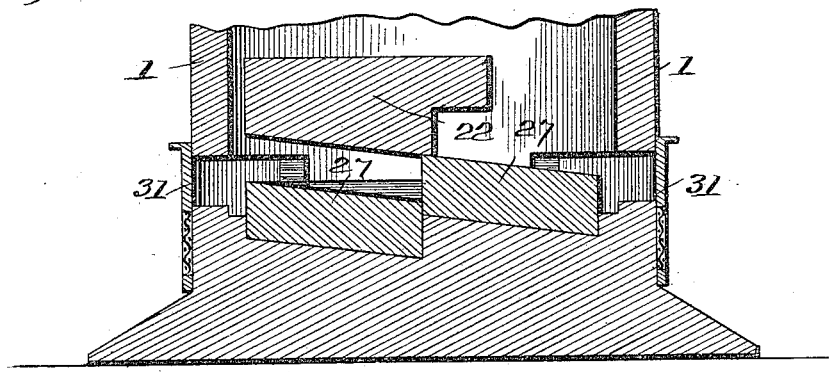
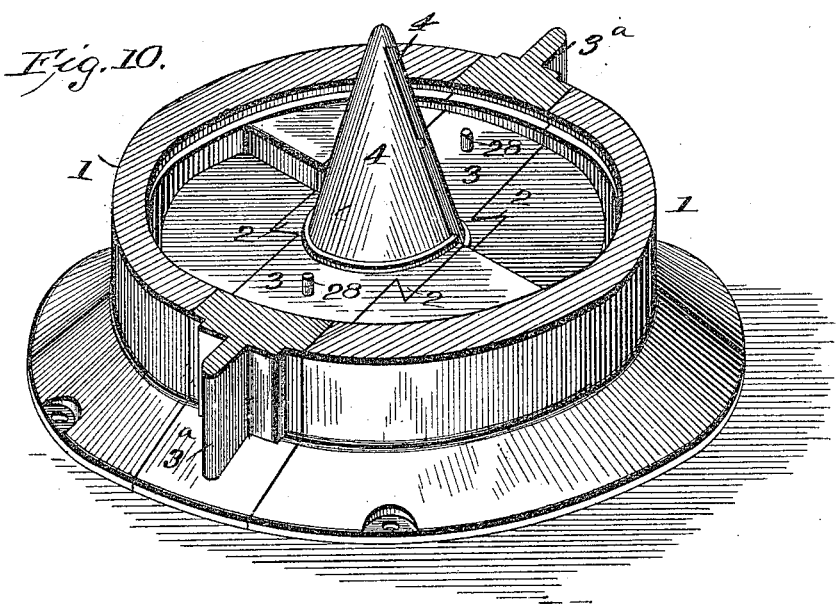

T. C. HISTED.
ORE MILL.
APPLICATION FILED MAR. 19, 1909.
949,982.
Patented Feb. 22, 1910.
6 SHEETS—SHEET 6.
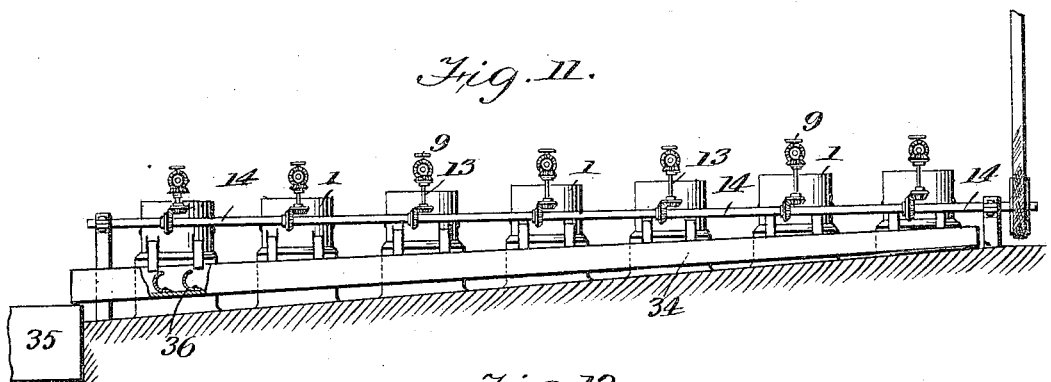
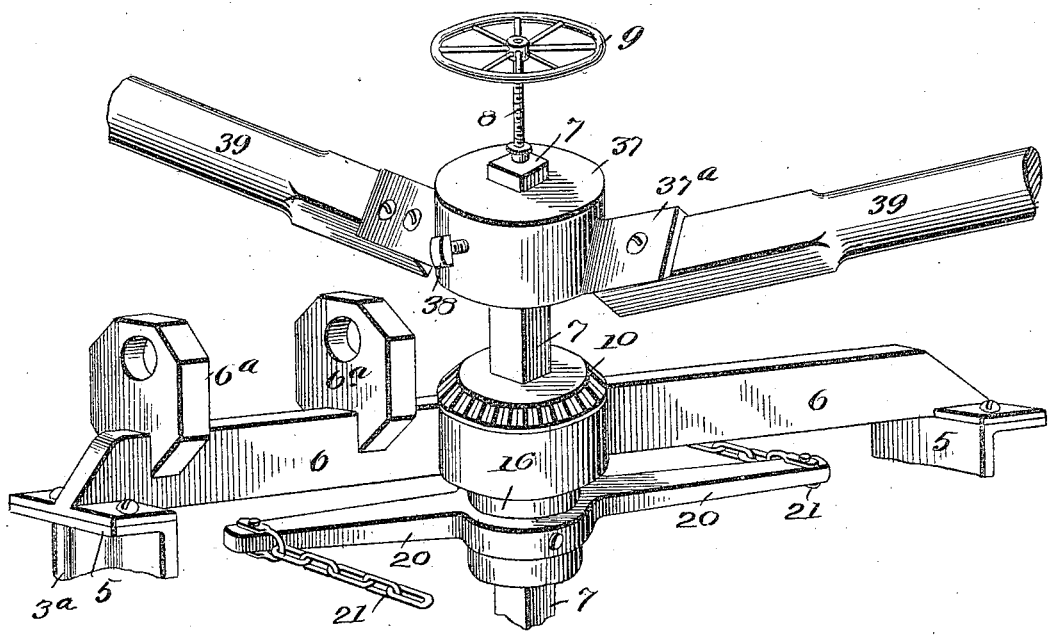
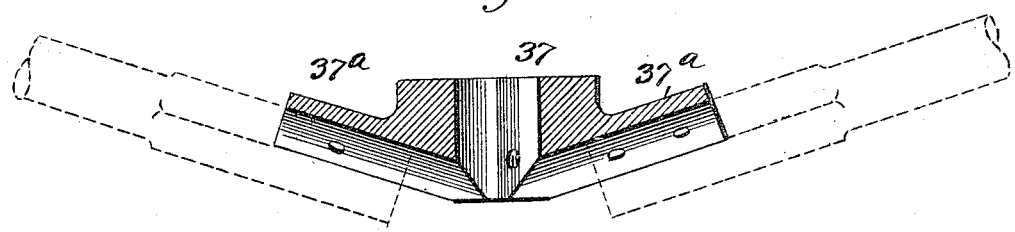
WITNESSES
Samuel E. Wade
Amos W. Hart
INVENTOR
THADDEUS C. HISTED
BY Munn & Co.
ATTORNEYS

UNITED STATES PATENT OFFICE.

THADDEUS C. HISTED, OF SHAWNEE, OKLAHOMA.

ORE-MILL.

949,982.  Specification of Letters Patent.  Patented Feb. 22, 1910.

Application filed March 19, 1909. Serial No. 484,413.

*To all whom it may concern:*

Be it known that I, THADDEUS C. HISTED, a citizen of the United States, residing at No. 202 West Main street, Shawnee, in the county of Pottawatomie, State of Oklahoma, have invented an Improvement in Ore-Mills, of which the following is a specification.

My invention is an improved mill for reducing ores containing precious metals, particularly quartz ores of both hard and soft varieties.

The invention combines the functions of a stamp mill and a grinder, in that it is adapted to hammer the ore so as to break it into small pieces and then grind and crush it into smaller particles.

The invention is embodied in the construction arrangement, and combination of parts hereinafter described and illustrated in the accompanying drawings in which—

Figure 1:
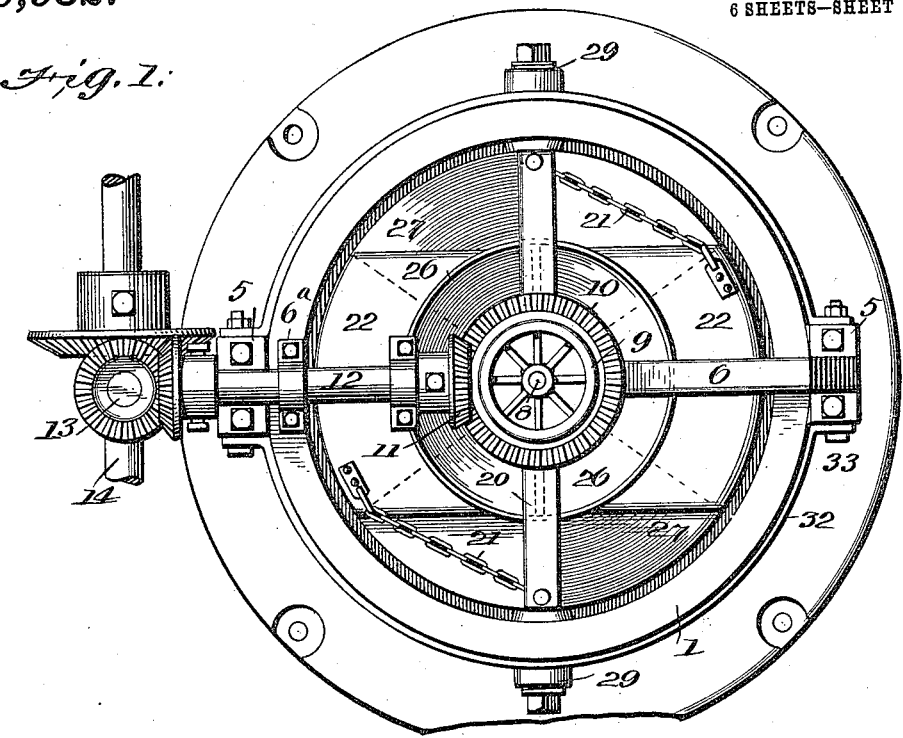
Figure 2:
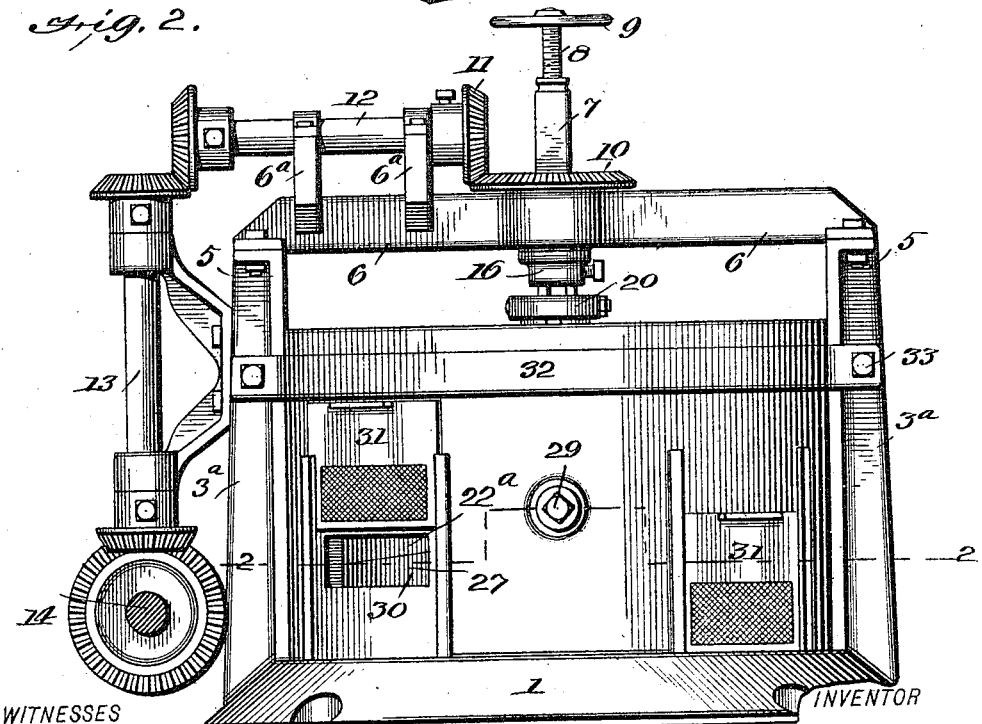
Figure 5:
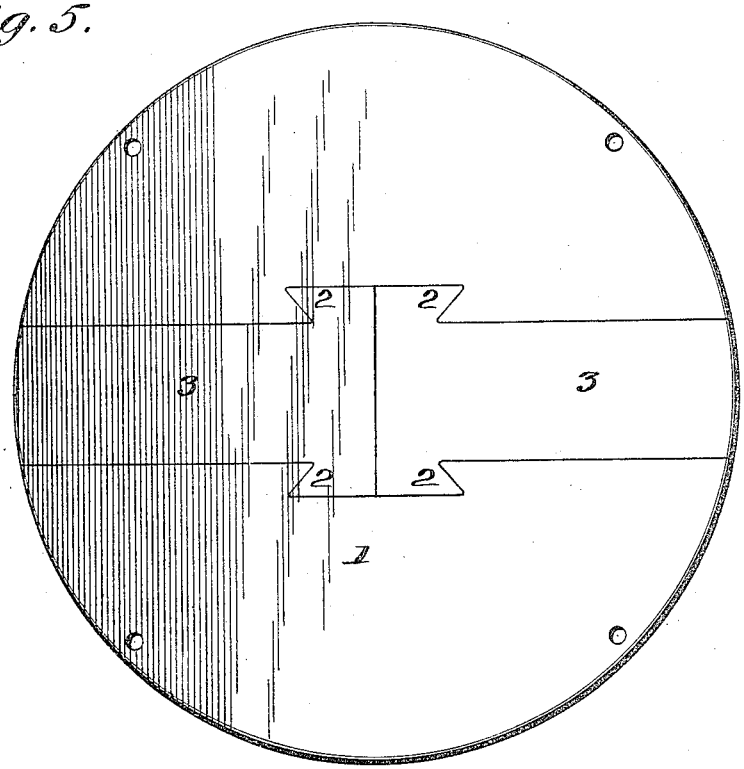
Figure 6:
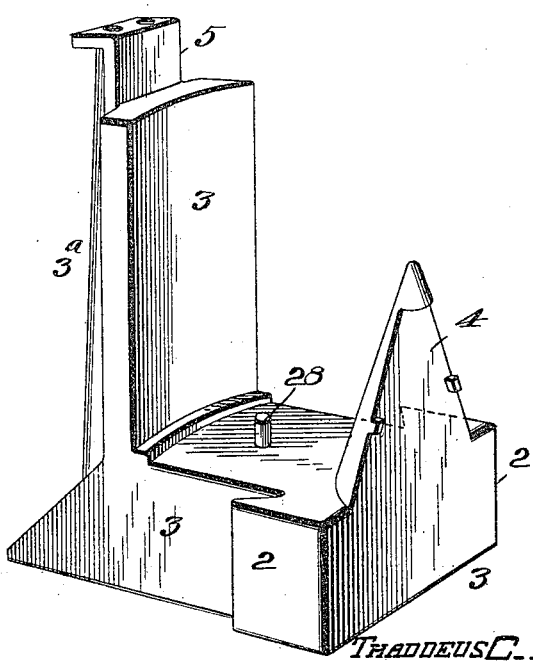
Figure 7:
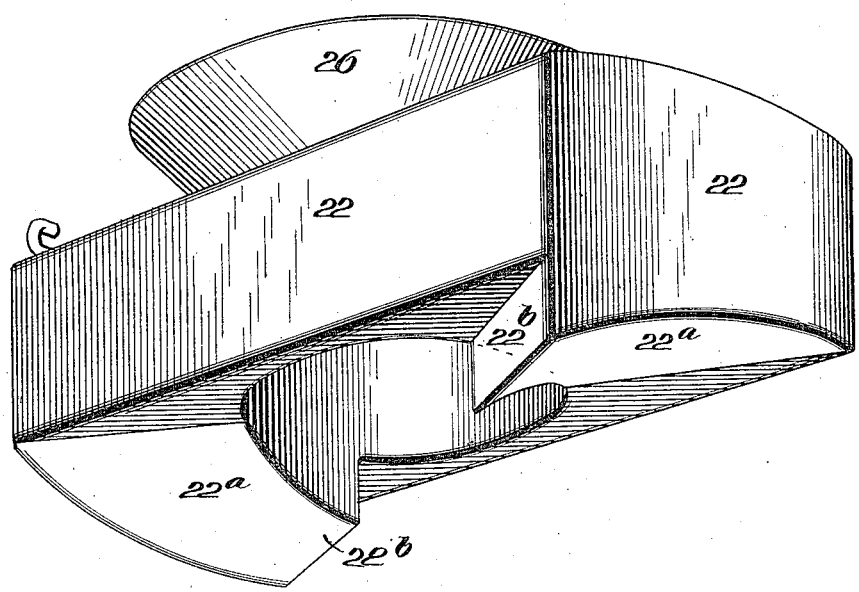
Figure 8:
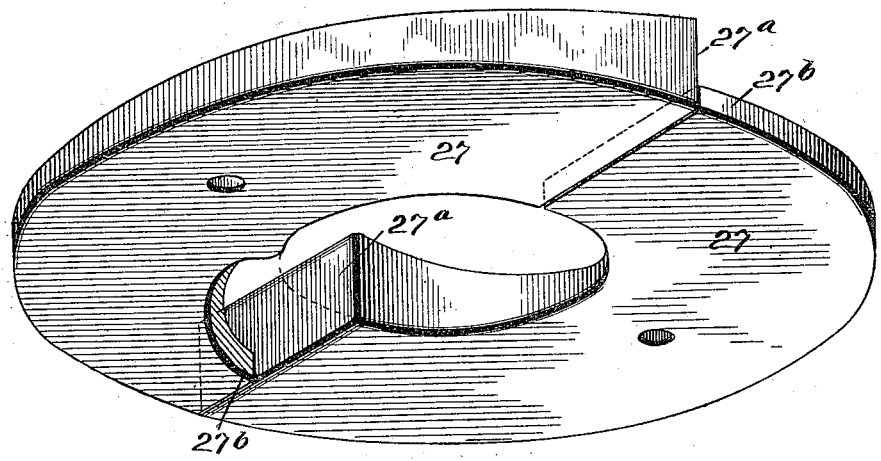

Figure 1 is a plan view of my improved mill. Fig. 2 is a side view of the same. Fig. 3 is a central vertical section. Fig. 4 is a horizontal section on the line 4—4 of Fig. 3. Fig. 5 is a bottom plan view of the mill. Fig. 6 is a perspective view of one of the separable side sections composing the body of the mill. Fig. 7 is a perspective view of a combined mill hammer and grinder. Fig. 8 is a perspective view of the shoes or grinding plates forming the false bottom of the mill. Fig. 9 is a vertical section of the mill, illustrating the coaction of the combined hammer and grinder with the bottom shoes, or grinding plates. Fig. 10 is a sectional perspective of the lower portion of the mill. Fig. 11 is a side view illustrating the manner of arranging and connecting a series of mills for operation by a single driving shaft and for discharging pulp into a single vat or reservoir. Fig. 12 is a perspective view of the upper portion of the mill frame and the sweep attachment of the central shaft. Fig. 13 is a sectional view of the part to which the sweep arms are attached.

The body of the mill comprises a vertical cylindrical casing, having a horizontal bottom; see especially Figs. 1, 2, 3. The body is constructed in four parts, or sections, which are separable from each other; thus, there are two side sections 1, see Fig. 5, the same being semi-circular on the outer side and their bottom portions provided with dove-tail sockets, to receive corresponding dove-tails 2 formed on the middle sections 3. One of the middle sections is shown detached and in perspective, in Fig. 6. As represented, it comprises a horizontal or base portion having half of a cone 4 at its inner end, and its outer vertical side provided with a vertical flanged extension 5 to which the cross-bar 6, also shown in Figs. 3 and 12, is detachably secured by means of screw-bolts. The half cones 4, when put together as shown in Fig. 3, furnish a bearing for a vertical shaft 7 having a vertical slot 7ª, see Fig. 3. Such shaft is hollow and receives a screw-shaft 8 having a hand-wheel 9. The shaft 7 passes through the hub of a bevel gear 10 with which it has a spline connection so that they rotate together. The hub of the gear 10 is seated in a cavity in the cross-bar 6 and the gear meshes with a smaller one 11 mounted on the horizontal shaft 12, having its bearings in lugs 6ª formed on the cross-bar 6. The shaft 12 is driven by means of a gear-connection 13 with a driving shaft 14, which, as shown in Fig. 11, may be similarly connected with a series of other mills so that all of them are driven from a common source of power. An anti-friction ball bearing is provided at 15 between the hub of gear 10 and the bottom portion of the bar socket. Below the bar 6, is a collar 16, that is clamped by a screw 17 on the adjacent portion of the slotted shaft 7. Balls 18 are interposed between this collar and the bar 6 of the frame, in order to reduce friction. The screw-shaft 8 has a swivel connection 19, with a bar 20 with whose ends the combined hammer and grinder 22 is connected by means of chains 21; see especially Figs. 1, 3, 12. The hollow shaft 7 is square and the hole in the bar 20 through which it passes has a corresponding form, so that the bar revolves with the shaft, while it is free to slide up and down thereon. A pin 24 couples the bar 20 with the slotted shaft 7, said pin passing through the slot in the part 7ª and being adapted to slide up and down therein. A spiral spring 25 surrounds the lower portion of the shaft 7 and is interposed between the bar or sweep 20 and the top portion of the combined hammer and grinder 22. It is apparent that by rotating the screw-shaft 8 in one direction or the other, the spring 25 may be compressed more or less and thereby the pressure of the hammer and grinder 22 may be varied accordingly, so that it will be caused to deliver blows more or less forcibly on the ore and also to press on and grind the same correspondingly.

As shown in Figs. 1, 3, 7, the hammer and grinder 22 is provided with a central opening adapted to receive the cone 4, and on its upper side with a flared rim 26 constituting a hopper into which the ore to be pulverized is fed from a spout (not shown). Thus the ore falls into the opening of the hammer and grinder that surrounds the cone, and passes laterally therefrom into the space between the hammer and the shoes, or grinding plates 27. These lie flat on the base of the casing and are prevented from rotation by dowel-pins 28; see Fig. 3. The shoes 27 are duplicated in form, as shown in Fig. 8, each being inclined spirally on its upper side, and one edge, to wit $27^a$, being made thicker and, therefore, standing above the adjacent thinner edge $27^b$ of the other shoe. The underside of the hammer and grinder 22 is correspondingly constructed with spiral inclines $22^a$, see Fig. 7, whose thicker ends $22^b$ are vertical. As indicated in Fig. 3, the upper sides or grinding surface of the shoes 27 is inclined from the outer side inward, to offset, in a degree, the tendency of the ore to work outward from the central opening of the grinder. It will be seen that the dowels 28 hold the shoes 27 in due position during the hammering and grinding operation, but permit the shoes to be readily detached when worn or broken.

In the operation of the mill, the combined hammer and grinder 22 revolves at a slow speed and once in every revolution it delivers a blow, that is to say, it drops or falls vertically when its vertical shoulders $22^b$ pass off the shoulders, or raised ends, $27^a$ of the shoes 27.

In Fig. 9, the hammer 22 is shown as having nearly reached the raised edge of the shoe and upon passing a little farther, it will obviously fall upon the shoe below. The force of the blow thus delivered by the hammer 22 will be proportionate to its weight and to the pressure of the spring 25, which, as before stated, may be regulated by the screw-shaft 8. It will be understood that, since ore always intervenes the shoes 27 and the hammer 22, the fall of the hammer is limited thereby, but that the ore is crushed more or less at each blow. Between the delivery of the blows it is obvious that a grinding action takes place between the parts 22, 27, since the part 22 is dragged or revolved circularly, by means of the chain connection 22 with the sweep 20.

In practice, a certain amount of water is delivered to the machine at points 29, see Figs. 1, 2, 4, where the screw plugs are shown inserted, and the pulp is discharged through lateral openings 30, which are shown in Figs. 2 and 9 provided with slidable screen doors 31, as usual in this class of machines.

The object in constructing the casing or body of the mill in sections, as before described, and as illustrated particularly in Figs. 5 and 10, is to adapt the mill for convenience of transportation on muleback in rough or mountainous country.

As represented in the drawing, the sections composing the body of the mill are castings, but I desire it understood, that they may be constructed of thin material, such as boiler-plate, for sake of lightness and ease of portability. The several sections are in any case secured together at the base by the dove-tail connections before described and at the top of the casing by means of semi-circular bands 32, see Figs. 1 and 2, the same having flanged ends which are secured together by bolts 33 passing through the side ribs $3^a$ of the middle sections 3. Thus, by removal of the bolts securing the bands 32, and the top bar 6, the parts or sections composing the body of the mill may be readily detached from each other.

As before stated, a single shaft 14 may drive a series of mills, as indicated in Fig. 11, and the whole series may be mounted on a suitable low foundation and secured thereto by bolts and deliver pulp into a common trough 34, which, lying at an incline, delivers into a vat or receptacle 35. This trough will, in practice, be provided with a series of riffles 36. A single mill may be operated by a sweep to which a mule or other draft animal may be attached. For this purpose, I provide a casting 37, as shown in Figs. 12 and 13, the same being provided with a central hub adapted to fit on the squared shaft 7 and clamped thereto by screw 38. The hub is provided with lateral angular lugs $37^a$, to which wooden sweeps or levers 39 are secured by bolts or screws, and the outer ends of such sweeps will be provided with suitable means for attaching the draft animal. It is apparent that the casting or sweep attachment 37 may be readily applied to, or removed from, the shaft of the mill.

What I claim is:

1. The improved ore-mill comprising a body constructed in detachable sections, the same including a vertical cylindrical casing, and side and middle base sections provided with corresponding dove-tail portions, which are adapted to interlock, substantially as described.

2. The improved portable ore-mill having a body formed of a cylindrical casing and horizontal base, the same being constructed in four parts consisting of two similar outer sections having their bases provided with dove-tail sockets, and two similar central sections provided with dove-tails adapted to fit in such sockets, and means for securing the upper portions of the casing together detachably, substantially as described.

3. An ore-mill of the class indicated, comprising a cylindrical casing and horizontal base formed in detachable sections, the middle sections being constructed with the halves of a cone adapted to fit together, substantially as described.

4. The ore-mill comprising a cylindrical casing and horizontal base, the same being formed of two similar parts 1 forming opposite sides, the two central portions having means for interlocking with the side portions and provided with a cone adapted to serve as a pivot for the revolving portion of the mill and as an ore distributer and means for securing together the sections of the base and casing, substantially as described.

5. In a mill of the class indicated, the combination, with a base grinding surface having inclines and shoulders as described, of a rotatable hammer and grinder and means for operating the same, said grinder being constructed with its base portion formed of opposite inclines and abrupt shoulders corresponding to the aforesaid base grinding surface, substantially as described.

6. In an ore-mill of the class indicated, the combination with the body of the same having a bottom grinding surface, of a rotatable grinder arranged to travel on such surface, a cone bearing projecting from the body through the grinder, an adjustable vertical shaft resting on such bearing, means for rotating such shaft, a screw shaft passing through the first-named shaft and adjustable vertically therein, a sweep or horizontal bar connected with the first-named shaft and also connected with the screw-shaft so that it may be adjusted vertically, a spring interposed between the sweep and the grinder, and means connecting the grinder with the sweep, substantially as described.

7. The combination, with the body of the mill, having a central base bearing and a top cross bar, of a rotatable grinder, a polygonal shaft resting on said base bearing, a sweep attachment connected with the grinder and adapted for vertical adjustment on the polygonal shaft, and sweeps adapted for attachment of draft animals, as shown and described.

THADDEUS C. HISTED.

Witnesses:
W. G. REYNOLDS,
C. D. RORER.